No. 852,312. PATENTED APR. 30, 1907.
H. P. BALL.
METHOD OF REPRODUCING MUSICAL COMPOSITIONS.
APPLICATION FILED MAY 3, 1904.

4 SHEETS—SHEET 1.

WITNESSES:
J. E. Pearson
Frank O'Connor

INVENTOR
H. P. Ball
BY
Geo. H. Benjamin
ATTORNEY

No. 852,312. PATENTED APR. 30, 1907.
H. P. BALL.
METHOD OF REPRODUCING MUSICAL COMPOSITIONS.
APPLICATION FILED MAY 3, 1904.
4 SHEETS—SHEET 2.
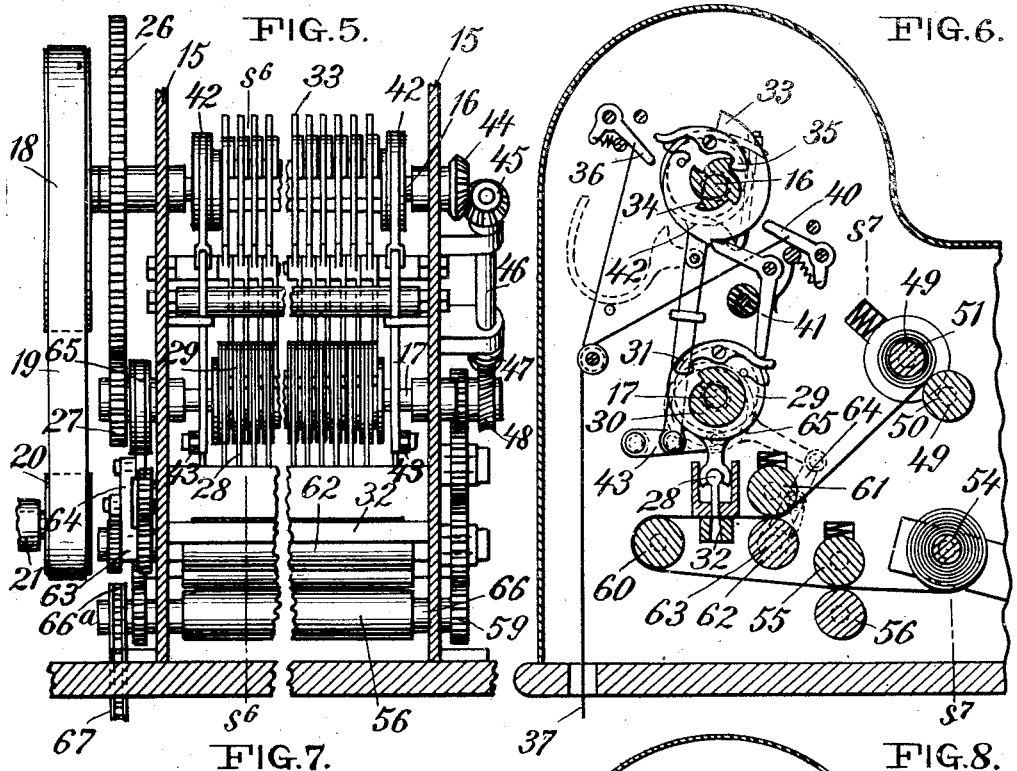
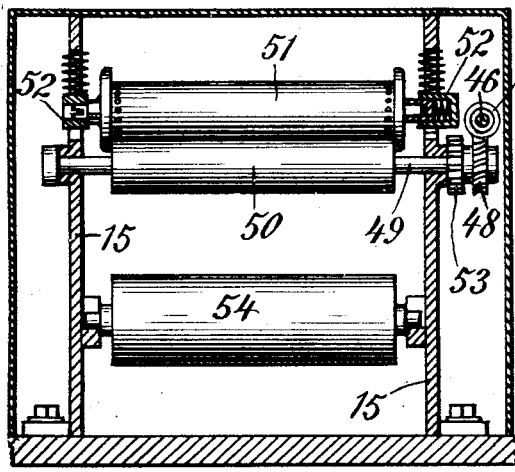
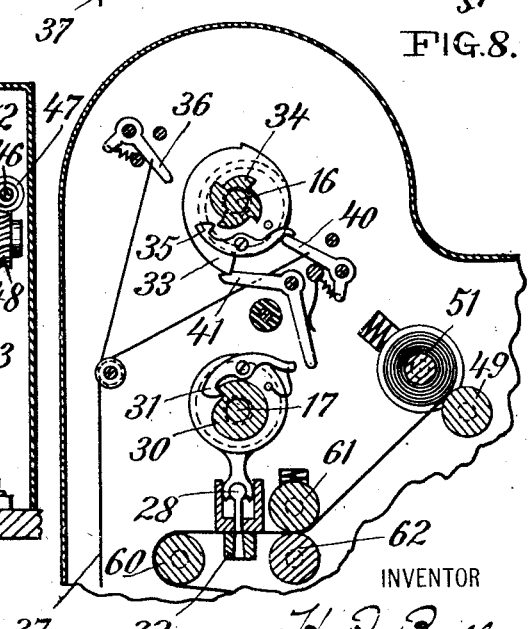
WITNESSES:
J. E. Pearson
Frank O'Connor
INVENTOR
H. P. Ball
BY
Geo. H. Benjamin
ATTORNEY No. 852,312. PATENTED APR. 30, 1907.
H. P. BALL.
METHOD OF REPRODUCING MUSICAL COMPOSITIONS.
APPLICATION FILED MAY 3, 1904.
4 SHEETS—SHEET 3.
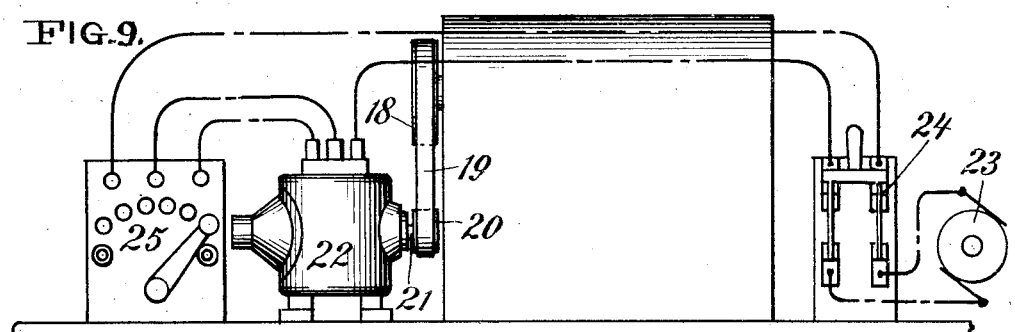
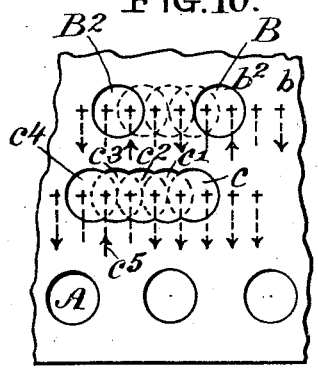
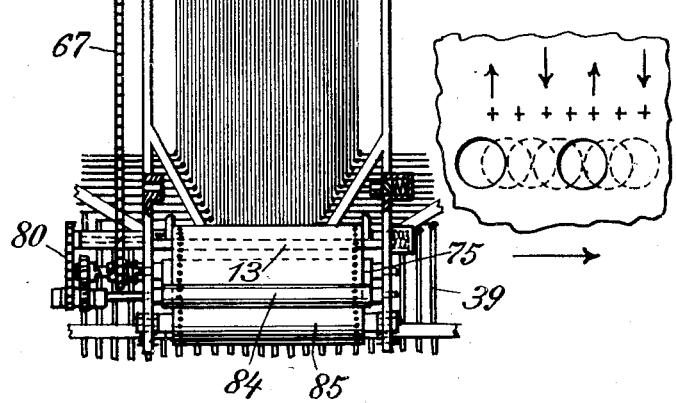
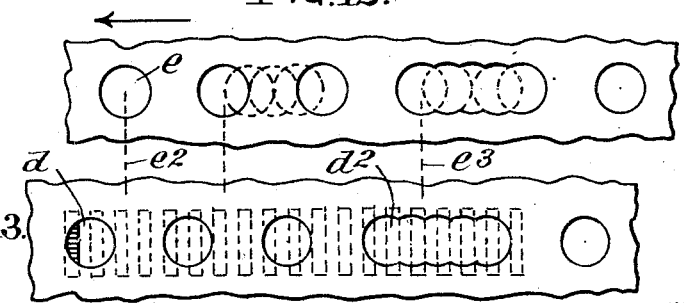
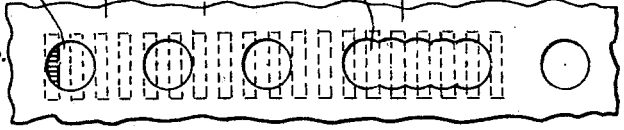
WITNESSES: INVENTOR
J. E. Pearson H. P. Ball
Frank O'Connor BY
Geo. H. Benjamin
ATTORNEY

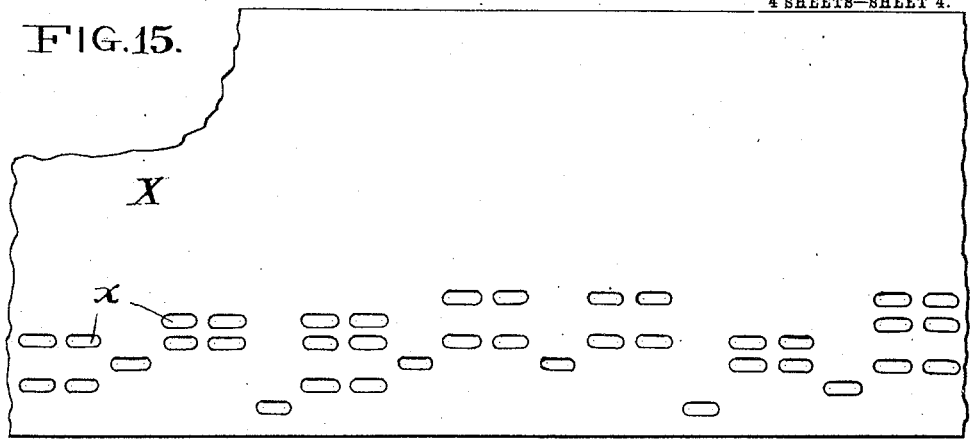
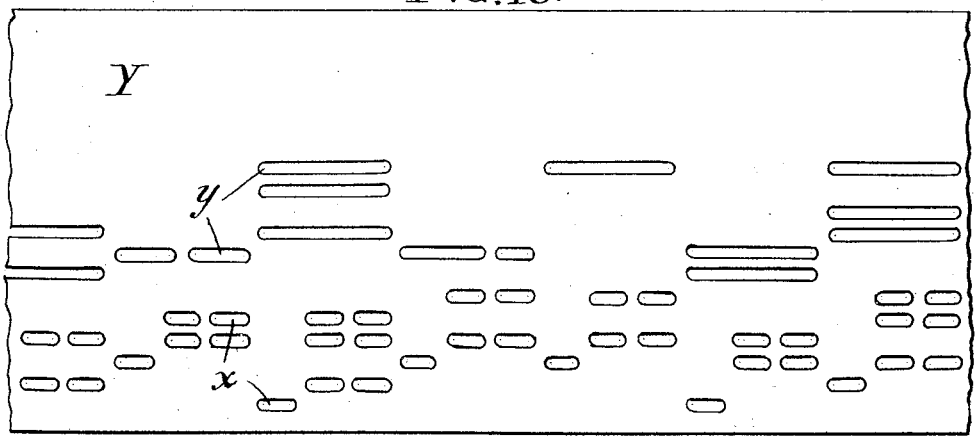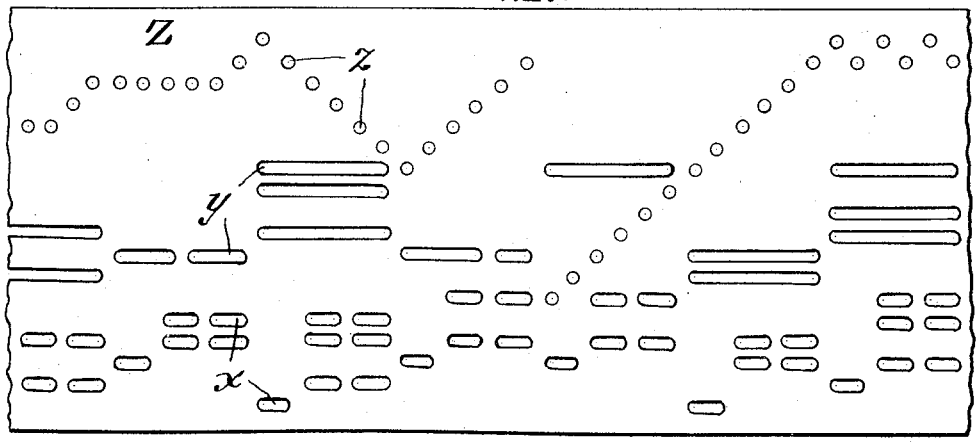

UNITED STATES PATENT OFFICE.

HENRY PRICE BALL, OF SCHENECTADY, NEW YORK, ASSIGNOR OF ONE-HALF TO SAMUEL INSULL, OF CHICAGO, ILLINOIS.

METHOD OF REPRODUCING MUSICAL COMPOSITIONS.

No. 852,312.  Specification of Letters Patent.  Patented April 30, 1907.

Application filed May 3, 1904. Serial No. 206,128.

*To all whom it may concern:*

Be it known that I, HENRY PRICE BALL, a citizen of the United States, residing at Schenectady, county of Schenectady, State of New York, have invented a new and useful Method of Reproducing Musical Compositions, of which the following is a specification.

My invention relates to a method of recording musical compositions for the production of master music sheets.

The object of my invention is to overcome the difficulty heretofore experienced in obtaining a record or master sheet of a musical composition, which, owing to its character, the number of notes, etc., etc., is far beyond the skill of an ordinary pianist or the physical ability of a single expert performer to reproduce complete upon a keyboard.

The master sheet I propose to produce is designed to contain a musical record, but the process of making the same is applicable for the production of perforated sheets for other uses.

The perforating mechanism which I have illustrated in the accompanying drawings as suitable for carrying my invention into effect, is fully described in applications heretofore filed by me, to wit: Serial No. 94,633, filed February 18th, 1902; and Serial No. 97,353, filed March 8th, 1902.

Figure 2:
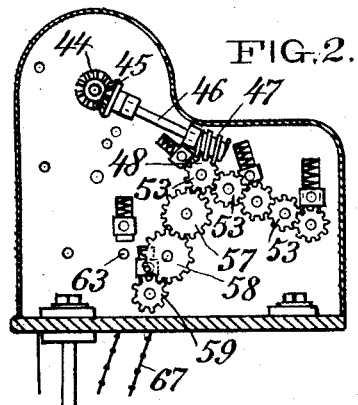
Figure 1:
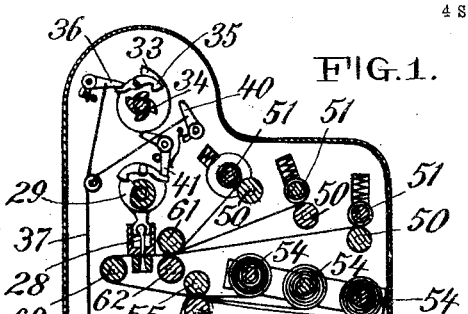
Figure 3:
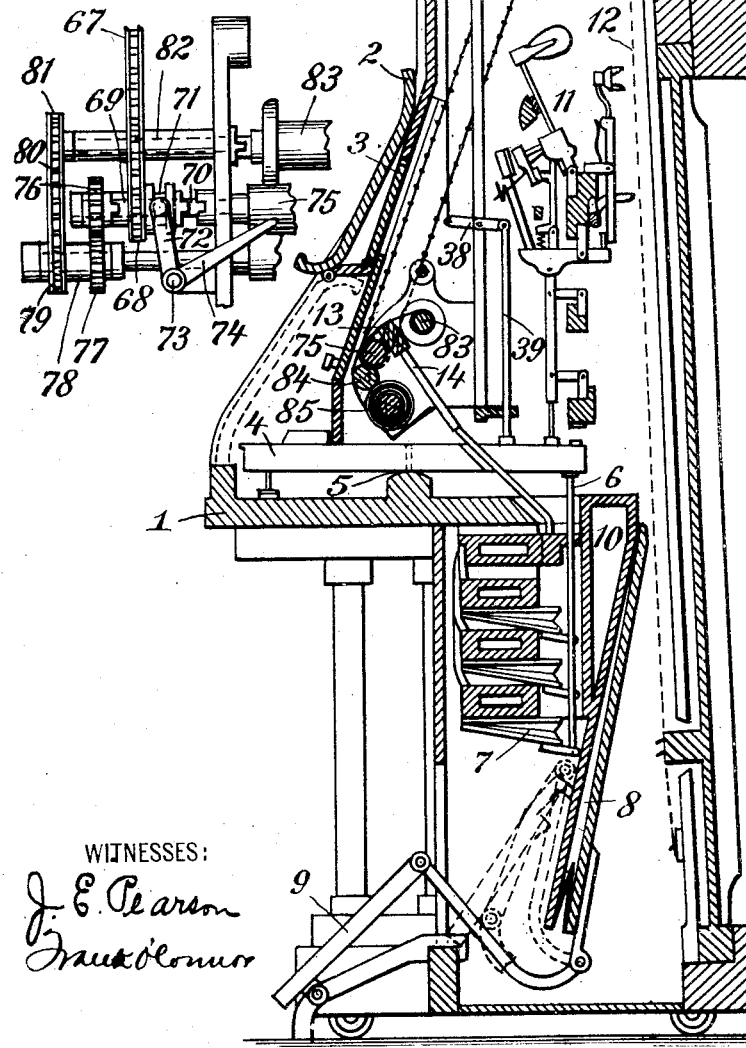
Figure 4:
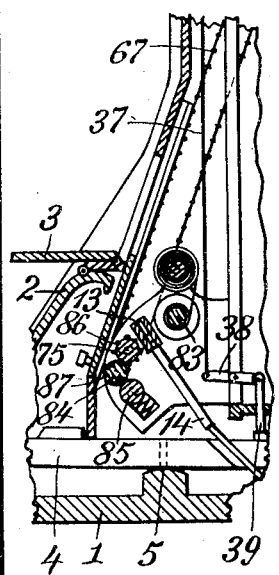

Referring to the drawings: Figure 1 is a vertical section through the instrument. Fig. 2 is an end view of the perforating mechanism with the casing shown broken away. Fig. 3 is a front view of the driving and rewinding mechanism for the master sheets. Fig. 4 is a partial section showing the cover employed for closing the front of the instrument in a position opposite to that shown in Fig. 1. Fig. 5 is a front view of the perforating mechanism employed. Fig. 6 is a longitudinal section on the line $S^6$, $S^6$, of Fig. 5. Fig. 7 is a horizontal section on the line $S^7$, $S^7$, of Fig. 6, showing the position of the delivery and take-up rollers and the means by which they are driven. Fig. 8 is a view corresponding to Fig. 6, showing the parts in a somewhat different position. Fig. 9 is a front view showing the mechanism for driving the perforating mechanism and the master sheet when used for reproduction. Fig. 10 is a view of a portion of a master sheet provided with the usual rack holes and showing diagrammatically the interval of time elapsing between striking the key to produce the notes and the responsive action of the perforator in recording the same. Fig. 11 is a similar view of a portion of a master roll, minus rack holes to permit its use in an ordinary mechanical player. Fig. 12 is a view of a portion of a commercial roll, the same being produced from a master such as that shown in Fig. 13. Fig. 13 is a view of a master illustrated in connection with a tracker-duct, the changing relation of the duct with respect to the perforations being indicated diagrammatically, also the interval of time elapsing between the opening of the tracker-duct by a perforation of the master and the responsive action of duplicator in forming a corresponding perforation in the copy (Fig. 12). Fig. 14 is a view of a portion of a commercial roll, showing diagrammatically the changing relation of the tracker-duct with respect to the note perforation in the reproduction of the notes by a mechanical player, also the time a note sounded is sustained as compared to the time originally occupied by the performer in operating or striking the key to produce such note. Fig. 15 is a view of a portion of a master music sheet produced as the first step in carrying out my invention. Fig. 16 is a similar view of a master produced as a second step in the operation, and Fig. 17 illustrates the completed master.

In the drawings: 1 represents the frame of the instrument. The frame has the general characteristics of an upright piano, although it may be given any shape. The front of the frame above the keyboard is closed by two pivoted covers, 2, 3, the first of which allows access to the tracker-board and the music strip and the other to the interior of the instrument.

4 represents the keyboard of the instrument, which is of the usual construction. The keys, it will be observed, are pivoted at 5. Connected to the lower side of the back of each key is a vertical rod 6, which rod at its lower end is connected to a power pneumatic 7. It will be understood that there will be a key, a rod and a power pneumatic for each note to be played. In the lower part of the instrument is the usual bellows 8, adapted to be actuated by the foot treadles 9. The bellows is connected to the wind chest 10 of the instrument in the usual manner.

11 represents a piano action, connected to the keys 4 and controlled in the usual manner; 12, strings of the instrument, which coöperate with the piano action; 13, a tracker-board connected through tubes 14 with the usual pneumatics.

Mounted on the top of the piano frame is the perforating mechanism. The perforating mechanism may be of any desired construction, that shown consists of the following parts. Vertical side plates 15, in which are mounted the transverse shafts 16, 17. Motion is given to these shafts by means of the pulley 18, belt 19, pulley 20, on shaft 21, of electric motor 22, which motor is driven from dynamo 23. For the purpose of controlling the motor there is interposed between it and the dynamo the switch 24, and the rheostats 25. The speed given to the shafts 16, 17, is determined by the gears 26, 27. Preferably the speed relation is such that shaft 17 will make four revolutions to one of the shaft 16.

The perforating mechanism is best shown in Figs. 6 and 8, and consists of a series of punches 28, mounted on eccentrics 29, arranged loosely on shaft 17. Adjoining each eccentric and secured to the shaft 17 are disks 30, each having a single notch adapted to co-act with latches 31, pivoted on the eccentrics 29. Situated under the punches is a die plate 32. It will be understood that when the latches 31 are engaged with the notched disks 30, the punches 28 will be reciprocated through the die-plate 32.

In order to control the latches 31, and also to introduce a time interval between the striking of a key and the operation of a punch, I provide the following mechanism.

Mounted loosely upon the shaft 16 are a series of cams 33, between which are situated toothed wheels 34, which co-act with latches 35, mounted on the cams. The latches 35 are normally in the position shown in Fig. 1, that is, disengaged from the toothed-wheel 34, and held in such disengaged position by means of the bell-cranks 36, which bell cranks 36 are connected to cords 37, connected through levers 38 and 39 with the rear ends of the keys 4.

Situated in the path of movement of the latches 35 are bell cranks 40, also connected to cords 37, and situated in the path of movement of the cams 33 are bell cranks 41, which co-act with the latches 31 on eccentrics 29.

It will be now understood that if the key or keys of the instrument are struck by the performer the piano mechanism 11 will be actuated and simultaneously, supposing a single key to be struck, a latch 35 will be released, which will engage with a toothed wheel 34 and thus effect rotation of a cam 33, and thereby actuate a bell crank 41 to throw a latch 31 into engagement with a notched desk 30, and thus produce motion of an eccentric 29 to actuate a punch 28. And further, that if a music strip having the usual characteristics is passed over the tracker-board 13, the power pneumatic 7 will be actuated according to the perforation in such music strip to actuate the piano mechanism 11 to reproduce the sounds originally played or to actuate the punching mechanism to produce duplicate music strip.

To produce rack holes in the sides of the music strip such as are indicated at A, Fig. 10, there is located on the opposite ends of the shaft 16, the eccentrics 42, best shown in Figs. 5 and 6, which actuate pivoted arms 43 carrying punches, not shown, in line with the punches 28.

To effect movement of the music strip or strips, to be perforated, I make use of the following mechanism: Mounted on the right hand end of shaft 16, is a beveled gear 44, in mesh with a beveled gear 45, on inclined shaft 46. This shaft has on its lower end a worm 47, in mesh with a worm gear 48 on shaft 49, Fig. 7. Mounted on shaft 49 is a roller 50, which bears upon the surface of a take-up roller 51, which roller is mounted in bearings 52, capable of vertical movement; which arrangement is for the purpose of compensating for an increased size of the take-up roller as the music strip is wound upon it. Three of such pairs of rollers 50, 51, are shown in Fig. 1. In order to transmit the motion of the first roller 50, to the succeeding rollers, gears 53 are interposed between such rollers.

54 represents rolls, on which the unperforated music strip is introduced into the machine.

In order to produce a continuous forward feed of the music strip toward the punches, the music strip after it leaves the rolls 54, is passed between the rolls 55, 56, the latter of which is driven positively from the shaft 49, through gears 53, 57, 58, 59.

In order to hold the music strip in a fixed position during the time a punch or punches is passing through it, the strip after it leaves the rolls 55, 56, passes over a roll 60, and then between the rolls 61, 62, the roll 61 being spring mounted to serve as a pressure roller, and the roll 62 upon a shaft 63, to which is connected a lever 64, pivotally connected to an eccentric 65, on shaft 17. The arrangement being such that when a punch is moving through the paper, the roller 62 will hold the paper between it and the roller 61, thus preventing the paper from moving forward past the punches but permitting it to be fed up to the punches. The general result being, that the paper is continuously fed forward from the roll 54, and makes a step by step motion past the punches 28 to the take-up roll or rolls 51.

Mounted on the opposite end of the shaft 66, on which the gear 59 is located, is a sprocket wheel 66ª, over which a sprocket chain 67 passes. This chain is carried downward and over a sprocket wheel 68, mounted on the longitudinally movable sleeve 69, on shaft 70. This sleeve is grooved as at 71, to receive pins projecting inward from the yoke-lever 72, pivoted at 73. Connected to this lever 72 is a handle 74. The opposite ends of the sleeve are arranged to co-act at the right with the roll 75, and at the left with the notched hub of a loose gear 76, in mesh with the gear 77, on sleeve 78, on which is mounted a sprocket wheel 79, over which passes a chain 80, which is carried over a sprocket wheel 81 on shaft 82, which shaft co-acts with the roll 83, on which the music roll or master is wound.

The arrangement as described forms a clutch mechanism, by means of which motion is given to the roll 75, pressure roll 84, and take-up roll 85, to produce a forward movement of the music strip or master roll, or a rewind of the music strip or master roll upon the roller 83.

The roll 75 is provided with circumferentially arranged spaced pins 86, which co-act with corresponding recesses 87 in the pressure roll 84. These pins on the roll 75 enter the perforations A, in the sides of the music strip and serve to give to the music strip a uniform forward movement across the tracker-board 13.

Referring now to Fig. 10, a portion of a music roll is shown, which may be produced by the mechanism above described either as an original master, when for example, such mechanism is manually controlled by an operator from the keyboard or as a duplicate master or commercial roll, when the mechanism is automatically controlled from the tracker-board.

While as above described, a continuous feed is employed for advancing the paper to the punches, its travel is periodically checked at a point adjacent to the punches by the action of the rollers 61 and 62, and thus controlled, its advance with respect to the punches is step by step a definite distance, as indicated by the dotted lines in Fig. 10. These lines divide the sheet longitudinally into equal spaces, and each space represents the length of paper fed forward during each feed step as controlled and determined by the action of the roll 62. As this roll is operated by an eccentric on the high speed shaft 17, it will therefore be seen that the paper is advanced a distance equal to one of the spaces indicated during each revolution of this shaft or each quarter revolution of the low speed shaft 16.

Understanding that the speed of this shaft 16 is such, that it will make at least one revolution for each possible repetition by the operator of a given note, and that one revolution of the cam 33, carried thereby will produce a single perforation such as B, in the paper, it will be seen that the immediate repetition of a note by the operator will result in producing a second perforation $B^2$ and that the distance between the centers of the perforations B, $B^2$, would therefore represent the minimum spacing of separate perforations the machine is capable of producing or in other words, the length of paper that passes under the punches during each revolution of the shaft 16 and cam 33. Such length is indicated at Fig. 10, as equal to four feed steps, corresponding in number with the teeth of wheel 34, which through the engaging latch 35 serves to operatively connect the cam 33 with the low speed shaft 16.

In the operation of the machine, there is an appreciable interval of time between striking the note and recording the same. This feature I will now describe.

It will be understood from the foregoing description of the mechanism, that the cam 33 starts in its travel at the instant the key is entirely depressed by the finger of the operator. Assuming now that a point $b$ (Fig. 10) on the paper is directly under the punch at the instant the operator depresses a key, as indicated by the arrow, while the cam 33 rotates through 180° the paper will be advanced two steps toward the right thus bringing the point $b^2$ under the punch. The cam thereupon throws the eccentric 29 into engagement with the high speed shaft 17, and as the paper advances one step or space for each complete revolution of the eccentric, the punch will act to perforate the paper when the eccentric has traveled through 180°, consequently the paper will advance beyond point $b^2$ only half a step or space, at which point it is perforated. In other words, the interval of time intervening between striking the note and recording the same, is that required for the paper to advance two and one-half steps or spaces and if the operator's finger is immediately raised after striking the note, as indicated by the arrow at point $b^2$, only a single punch action follows, and it will be seen that the perforation would not be formed until after the finger has allowed the key to raise.

As the foregoing refers to a note of extremely short duration such as would be produced by a staccato movement of the fingers, I will now describe the recording of a sustained note. The punch responds to the depression of the key in this instance as in that above, and similarly after the paper has advanced two and one-half spaces and forms the perforation $c$, (Fig. 10.) The operation in this instance differs, however, in that by continuing to depress the key, the cam 33 on traveling through 180° is brought to rest by the action of the bell cranks 36, in disengaging the latch 35, causing the cam 33 to stop. In this position the cam engages and holds the bell crank 41 clear of the tail of latch 31, thereby permitting the eccentric 29 and its punch 28 to operate continuously and form a series of interconnecting perforations. As the gearing connecting the high and low speed shafts is four to one, it will be seen that second revolution of the eccentric 29, will follow while the cam shaft moves through the final quarter and completes its revolution, consequently a second perforation $c'$ will be formed in the paper overlapping the first and combining with it to form an elongated opening. While the performer continues to sustain the note, i. e., depresses the key, the punch 28 under the action of the eccentric 29 will operate during each revolution thereof to perforate the paper as indicated at $c$, $c'$, $c^2$, $c^3$ and $c^4$, the final operation of the punch in forming the perforation $c^4$ occurring after the performer has raised his finger from the key, as indicated by the arrow $c^5$, and similarly indicated at $B^2$ with reference to separate perforations.

The perforations represented in the portions of the music roll shown in Fig. 11, are formed in the manner above described, the step by step movements of the paper under the punches being indicated by the crosses, the movements of the finger of the performer by vertical arrows, and the general direction of feed of the paper by the horizontal arrow. This roll being minus rack holes may be used in a mechanical player in connection with a tracker-board to audibly reproduce the recorded notes.

Bearing in mind that the length of paper passing under the punches during each revolution of the low speed shaft, equals four of the spaces, indicated in Fig. 10, and further, that there are four teeth on the wheel 16 with which the cam 35 engages, it will be seen that the movement of the cam 33 with respect to the punch, is timed to co-act in exact synchronism and that the punch cannot therefore assume any relative position of adjustment which will render it incapable of responding at the instant the cam acts.

It will also be observed, that by reason of the fact that the spacing of separate note perforations cannot be less than a given minimum distance, it is impossible for separate records to overlap or run together and thereby become obliterated.

Referring to Fig. 10, it will be seen that a perforation such as B, for example, is relatively shorter longitudinally, than the length of paper passing under the punches during the time the key is held depressed. Yet when this perforation is passed over a tracker-duct, the note as reproduced, will have the same duration as the note originally played by the performer, as represented in Fig. 14, which shows the extreme positions the tracker-duct would assume relatively to the perforation, also, by the vertical arrow, the up and down movements of the operator's fingers in sounding such a note.

Referring now to Figs. 12 and 13, I will describe the operation of reproducing in a sheet of paper the exact counterpart of the perforations in the master, the machine in this instance being automatically controlled from the tracker-board. In connection with the master, (Fig. 13) there is shown a tracker-duct in the various positions it assumes relatively to the perforations in the sheet, as the latter moves toward the left as indicated by the arrow. These positions being spaced to correspond to the step by step movements of the paper as indicated in Fig. 10 or the maximum reciprocations of the punch. As the perforations $d$, of the master opens the tracker-duct, the latch 35 acts to connect the cam 33 (Fig. 6) with the low speed shaft 16, and for every quarter revolution of this shaft, the position of the tracker-duct will change relatively to the perforation as indicated in Fig. 13. The first perforation $e$, will therefore be formed in the copy in the third position indicated by the dotted line $e^2$, or after the paper has been advanced two and one-half spaces under the punches following the opening of the duct. In view of the fact that this perforation is not made immediately the tracker-duct is opened, it will be seen that as reproduced in the copy, the perforation is formed by a single stroke of the punch as in the master. That is to say, for every single perforation in the master, there is a corresponding perforation in the copy and likewise, the copy is produced with the same number of consecutive inter-connecting perforations forming a slot as in the master.

The slot $d^2$, Fig. 13, in the master, is formed of five consecutive inter-connecting perforations, but its length is such as to open the tracker-duct for six possible punch operations, and in order to duplicate this slot in proper length in the copy, the machine operates initially at a loss of two and one-half spaces of feed length of paper through the action of the cam 33, etc., as above described, preliminary to forming any perforation. It then forms a perforation in the third space at $e^3$, but this loss is compensated for in part by the action of the punch in forming the final perforation after the tracker-duct is closed. Consequently, the punch acts four times while the duct is open and once after it is closed, thereby forming a slot in the copy of five consecutive perforations as in the commercial sheet used temporarily as a master.

Assuming that a record or master sheet is desired of an extremely difficult piece of music, the execution of which, as written, is beyond the ability of an ordinary pianist. The performer first selects a series of notes of the composition, representing, for example, the accompaniment, and plays the same upon the keyboard of the instrument. The perforator mechanism being responsive to the movements of the keyboard, a record or master sheet X, such as is represented in Fig. 15 will be produced. As the next step, a second master is made, containing a series of note perforations $x$, the duplicate of those of the original master, and such additional notes of the composition as the operator may desire to record. The second master sheet Y, is produced by arranging the music sheet X, to be fed across the tracker-board, and upon starting the perforator into operation, the performer elaborates the original record by selecting and playing a second series of notes $y$, being assisted and guided in this instance, by the audible reproduction of the original record through the responsive action of the piano in sounding the notes selected by the sheet in moving across the tracker-board. The perforator being responsive to both the keyboard and the tracker-board, the second master produced and represented in Fig. 16, will contain perforations representing both series of notes, i. e., those indicated at $y$, selected and played by the performer upon the keyboard, and those indicated at $x$, selected by the music sheet, X, in passing across the tracker-board. As the final step, the second master sheet Y, is substituted for the first, by being arranged to co-operate with the tracker-board, and on starting the perforator into operation, the third or complete master Z, shown in Fig. 17, is produced, the performer playing the remaining treble notes of the composition which are recorded simultaneously during the operation of the perforator in duplicating the record of the second master Y. The final master sheet will therefore contain three series of note perforations, $x$, $y$ and $z$, as shown.

It will be understood that any portion of a musical composition may be played by the performer as the first step in the operation, and that the subsequent elaboration necessary to complete the record may involve the making of any number of additional masters, depending upon the character of the composition, number of notes and the ability of the performer to reproduce the same upon the keyboard.

Having thus described my invention, I claim:—

1. The herein described method of making a perforated record of the performance of a musical composition which consists in recording a portion of the composition, and then using this record to reproduce itself simultaneously with the recording, on the reproduced record, of additional portions of the composition as played by the performer.

2. The herein described method of making a perforated record of the performance of a musical composition, which consists in building up a complete record by causing a master record to reproduce itself upon a new record and simultaneously recording manually selected notes upon such new record.

3. The herein-described method of making a master sheet which consists in first forming in a separate sheet a series of perforations less than is required to indicate the musical composition, causing said separate sheet to actuate mechanism to produce in the master sheet corresponding perforations and simultaneously actuating perforating mechanism to introduce in said master sheet such remaining perforations as is necessary to cause the master sheet to contain a record of the entire musical composition.

4. The herein described method which consists in employing a perforated musical record as a master to reproduce itself, and simultaneously inserting in such reproduction an additional perforated record as part of the same musical composition.

5. The herein described method which consists in making a perforated master, then causing such master to produce a second perforated master, and simultaneously recording on the second master an additional part of the same composition.

6. The herein described method which consists in making a perforated master, then causing such master to produce a second perforated master, and simultaneously recording on the second master a series of manually selected notes as part of the same composition.

7. The herein described method which consists in making a perforated master of a portion of a musical composition, then causing such perforated master to produce a second master, and simultaneously recording on the second master an additional part of the same musical composition.

8. The herein described method which consists in making a master in the form of a perforated sheet, then causing such master to produce a second master as a perforated sheet, and simultaneously recording, as perforations in the second master, an additional part of the same composition.

9. The herein described method which consists in making a perforated master, then causing the master to reproduce itself, and simultaneously recording on the second perforated master an additional portion of the same composition.

10. The herein described method which consists in causing a perforated musical record to reproduce itself, and simultaneously inserting in such reproduction an additional perforated record as part of the same composition.

In testimony whereof, I affix my signature, in the presence of two witnesses.

HENRY PRICE BALL.

Witnesses:
J. E. PEARSON,
FRANK O'CONNOR.